B. W. F. VAN DUZER.
CHAIN-PUMP BUCKETS.
No. 184,191. Patented Nov. 7, 1876.
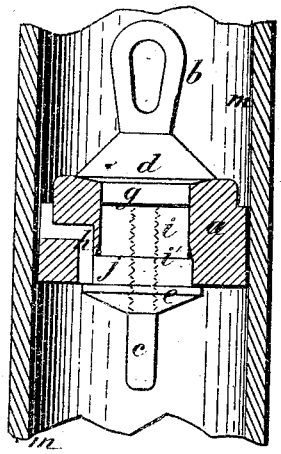
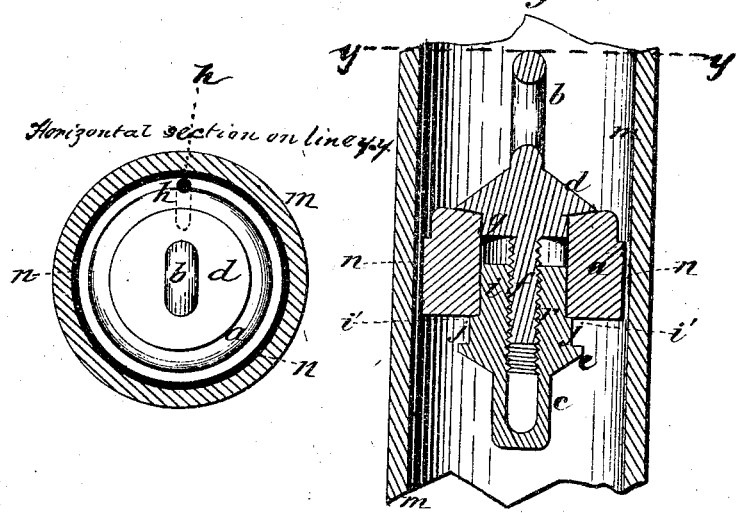
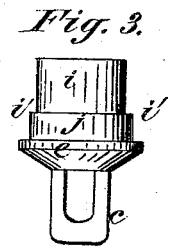
Witnesses:
Inventor:
Benjamin W. F. Van Duzer,
By Johnson & Johnson
his Att'ys.

UNITED STATES PATENT OFFICE.

BENJAMIN W. F. VAN DUZER, OF WINDHAM SUMMIT, PENNSYLVANIA.

IMPROVEMENT IN CHAIN-PUMP BUCKETS.

Specification forming part of Letters Patent No. 184,191, dated November 7, 1876; application filed May 25, 1876.

*To all whom it may concern:*

Be it known that I, BENJAMIN W. F. VAN DUZER, of Windham Summit, in the county of Bradford and State of Pennsylvania, have invented certain new and useful Improvements in Chain-Pump Buckets, of which the following is a specification:

My improvement relates to rubber buckets for endless-chain pumps for drawing water from open well-tubing, my object being to obtain a strong coupling, and afford firm supports for the rubber buckets in connection with means for adapting the buckets for use with a close wall-joint in the tubing in warm weather, and with an open annular wall joint or way for draining the water from the tubing in cold weather to prevent freezing, and in connection with these I provide drain perforations in the bucket; but the annular wall drain or way is especially adapted to prevent the bucket freezing to the wall, as will be hereinafter more specifically described.

In the accompanying drawings, Figure 1 is a section of one of my improved rubber buckets as adapted for use in warm weather with a close tubing joint; Fig. 2, a similar section as adapted for use with an open annular wall drain or way in cold weather, and Fig. 3 the double-hubbed coupling.

The bucket $a$ is a cylindrical piece of rubber clamped between two couplings, $b$ $c$, each provided with an annular bearing-flange, $d$ $e$, which afford strong supports to the bucket, and allow it to be made with broad bearings upon the sides of the tubing. The upper one of these couplings, $b$, is provided with a screw-stem, $f$, and a cylindrical hub, $g$, below the bearing-flange $d$, while the lower coupling $c$ is provided with a cylindrical hub, $i$, which has a screw-socket, $r$, into which the screw-stem $f$ enters to unite the couplings and draw the hubs within a central opening in the rubber bucket. The lower coupling $c$ has a double hub, or rather a supplemental hub, $j$, the object of which is to expand the lower portion of the rubber bucket to cause it to form a close bearing-joint on the wall of the tubing when the supplemental hub $j$ is drawn by the screw-stem fully within the central opening of the bucket, and to allow such supplemental hub $j$ to be drawn out of its bearing with the bucket to cause the latter to contract sufficient to form an open annular joint or way, $n$, between it and the tubing, so that the water can drain out from each bucket when not in use. I have found that this open annular drain-way at the wall of the tubing is much more effective for the purpose than drain-openings in the body of the bucket however formed, because it prevents the buckets from freezing to the walls of the tubing, and by this means I am enabled to use a broader bearing in the buckets, and, consequently, a more durable bucket than those having a comparatively thin edge with drain perforations. When the bucket is thus adapted for use the hub $i$ fits within and fills the central opening with the shoulder $i'$ of the supplemental hub brought close to the lower end of the bucket and forming a close coupling-joint. This adjustment of the supplemental hub is readily effected by unscrewing the upper coupling a distance equal to the depth of the supplemental hub in each bucket, and drawing the lower coupling down that distance when the couplings are again clamped with the hubs $g$ $i$ of equal diameter within the opening of the bucket, so that in either adjustment of the couplings there will always be two bracing and bearing hubs within the buckets. The adjustment of the buckets to form the annular wall drain or way $n$ need be only sufficient for its purpose to effect a separation of the buckets from the tube-wall $m$, and which I have found does not impair the efficiency of the buckets to an extent that is at all equal to the objection of the buckets freezing to the wall with a close joint. The buckets may also be provided with perforations $h$ to drain out the water at all times, so that it may not stand in the tubing even in warm weather, and in this way I provide in the buckets drain perforations with a close wall-bearing and means for making an annular drain or way, $n$, between the tubing-wall and the buckets. The hubs $g$ $i$ are adapted to give a broad bearing to the bucket, and I find thereby that the latter needs no adjustment to compensate for the wear that takes place with a thin-edge joint bucket, such as has been used with tapering screw-hubs connecting the couplings, and which adjustment is objectionable, as well as the liability of the thin-edge buckets to wear away. These difficulties my improved bucket avoids very effectually. The couplings are united by suitable lengths of chain in the usual manner.

I claim—

1. In an endless-chain pump, the couplings $b$ $c$, provided with hubs $g$ $i$ of equal diameters, in combination with the screw-stem $f$, the screw-socket, and the rubber bucket $a$, as and for the purpose described.

2. The supplemental or shouldered hub $j$ in combination with the hub $i$ and the rubber bucket $a$, whereby to adjust the bucket to form an annular drain or way $n$ between the bucket and the wall of the tubing.

3. The combination in an endless-chain pump bucket of the annular wall drain or way $n$ with the drain perforations $h$ in the bucket, as and for the purpose described.

In testimony whereof I have affixed my signature in the presence of two witnesses.

BENJAMIN W. F. VAN DUZER.

Witnesses:
S. B. HOYT,
G. W. SMITH.